(12) United States Patent
Harris

(10) Patent No.: US 6,889,035 B2
(45) Date of Patent: May 3, 2005

(54) CABLE-LESS INTERCONNECT ARCHITECTURE FOR EFFECTING BLIND COUPLING OF DIPLEXER TO RADIO TRANSCEIVER

(75) Inventor: Joseph L. Harris, Athens, AL (US)

(73) Assignee: Adtran, Inc., Huntsville, AL (US)

( * ) Notice: Subject to any disclaimer, the term of this patent is extended or adjusted under 35 U.S.C. 154(b) by 610 days.

(21) Appl. No.: 09/941,913

(22) Filed: Aug. 29, 2001

(65) Prior Publication Data

US 2003/0045260 A1 Mar. 6, 2003

(51) Int. Cl.[7] ................................................. H03C 3/00
(52) U.S. Cl. ...................................... 455/109; 455/203
(58) Field of Search ........................... 455/44, 45, 109, 455/203, 204, 206

(56) References Cited

U.S. PATENT DOCUMENTS 5,999,561 A * 12/1999 Naden et al. ................ 375/206
6,178,312 B1 * 1/2001 Nelson et al. ............... 455/109
2003/0053520 A1 * 3/2003 Nelson et al. ............... 375/142
2003/0067869 A1 * 4/2003 Harris et al. ................ 370/217
2003/0068989 A1 * 4/2003 Harris et al. ................ 455/115

\* cited by examiner

*Primary Examiner*—Creighton Smith
(74) *Attorney, Agent, or Firm*—Allen, Dyer, Doppelt Milbrath & Gilchrist, P.A.

(57) ABSTRACT

An RF cable-less interconnect arrangement couples a diplexer to a radio transceiver by providing each of the transceiver and the diplexer by means of respective pairs of RF transmission and receiver channel connectors. The two sets of connectors are supported at a prescribed spatial separation for blind-mating RF connectivity for either of two orientations and translation (insertion) of the diplexer into the radio. Eliminating lossy and relatively fragile RF cable, that would otherwise occupy space within the radio's housing, and require installation by a skilled technician during assembly of the radio, allows the customer to easily change the radio's frequency plan by simply removing, rotating and reinserting the diplexer.

7 Claims, 2 Drawing Sheets

CABLE-LESS INTERCONNECT ARCHITECTURE FOR EFFECTING BLIND COUPLING OF DIPLEXER TO RADIO TRANSCEIVER

FIELD OF THE INVENTION

The present invention relates in general to communication systems and components therefor and is particularly directed to a new and improved interconnect arrangement for effecting a cable-less blind coupling of a diplexer to a transceiver of an associated radio, such as that used for digital telecommunications, irrespective of a selected one of a plurality of available frequency plans for the radio.

BACKGROUND OF THE INVENTION

Although legacy (copper) wirelines have served as a principal information transport backbone for a variety of telecommunication networks, the continued development of other types of signal transport technologies, particularly those capable of relatively wideband service, including coaxial cable, fiber optic and wireless (e.g., radio) systems, have resulted in a multiplicity of systems that serve a diversity of environments and users. A particular advantage of wireless service is the fact that it is very flexible and not limited to serving only customers having access to existing or readily installable cable plants. Moreover, there are many environments, such as, but not limited to portable data terminal equipments (DTEs), where a digital wireless subsystem may be the only practical means of communication.

In order to provide digital communication service, the wireless (radio) subsystem must be interfaced with an existing digital network's infrastructure, which typically includes legacy wireline links (that may contain one or more repeaters) coupled to an incumbent service provider site. In addition, the digital radio site which provides access to the wireline must also provide a source of electrical power. In many environments, the required power supply is either not readily available, or its cost of installation is prohibitively expensive.

The invention described in co-pending U.S. patent application, Ser. No. 09/771,370, filed Jan. 25, 2001, by Eric Rives et al, entitled: "Loop-Powered T1 Radio" (hereinafter referred to as the '370 application), assigned to the assignee of the present application and the disclosure of which is incorporated herein, is directed to a loop-powered digital (T1) radio architecture that is configured to solve this lack of available local power problem by extracting power from the line. This effectively eliminates having to locate the radio where a separate dedicated power supply is either available or can be installed, so that the radio may used practically anywhere access to a powered wireline is available.

The radio itself may comprise a blue tooth (spread spectrum) digital radio associated with portable digital terminal equipment, such as a notebook computer, or a remote digital radio that terminates a separate powered wireline. Power for operating the radio is extracted from the loop via a line interface coupled to tip and ring portions of respective transmit and receive segments of a powered T1 wireline link. The line interface contains a DC—DC converter to scale down the span voltage to standard voltages used to power the radio's digital signaling and transceiver electronics.

As diagrammatically illustrated in FIG. 1, the radio proper has a transceiver 10 (e.g. one that is 'blue tooth'- compatible), which performs modulation and up-conversion of baseband signals supplied from a data pump (T1 framer chip) 12 to an FCC-conformal band RF signal (e.g., a 2–6 GHz spread spectrum signal), for application via a first section of cable plant 14 to a first transceiver port 21 of a diplexer 20. The diplexer 20 has an (N-type) antenna port 23 coupled to an associated radio antenna 25. A second transceiver port 22 of the diplexer 20 is coupled via a second section of cable plant 15 to a receiver section of the transceiver, wherein the received RF signal is downconverted and demodulated to baseband for application to the data pump. The respective transmit and receive frequencies interfaced by the diplexer 20 with the antenna 25 are prescribed by one of two complementary frequency plans, the other of which is employed by a companion radio at a remote site.

To facilitate selectivity of either frequency plan, the radio transceiver—diplexer arrangement is preferably configured in the manner described in the U.S. Pat. to P. Nelson et al, U.S. Pat. No. 6,178,312, issued Jan. 23, 2001, entitled: "Mechanism for Automatically Tuning Transceiver Frequency Synthesizer to Frequency of Transmit/Receiver Fitler" (hereinafter referred to as the '312 Patent), assigned to the assignee of the present application and the disclosure of which is incorporated herein. As shown and described therein, the frequency plan (transmit/receive frequency pair) of the radio is defined by selectively coupling the appropriate one of two diplexer ports of a diplexer unit to the transmit port of the transceiver and the other diplexer port to the receive port of the transceiver. (At the far end or remote site the diplexer to transceiver port connections would be reversed.)

Because the sections of RF cable through which these diplexer-to-transceiver connections are made are lossy (e.g., 1–2 dB of insertion loss), special purpose, relatively fragile, and take up space within the radio's housing, they are installed by a skilled technician during assembly of the radio in accordance with the intended frequency plan of the equipment. As a consequence, should it be necessary to change the frequency plan of the radio in the field, it is customary practice to 'swap out' both units at opposite ends of the radio link, and the radios returned to the equipment supplier for refurbishment.

SUMMARY OF THE INVENTION

In accordance with the present invention, this cable connectivity problem is effectively obviated by providing each of the radio transceiver and the diplexer with respective pairs of blind-mating RF transmission channel and receiver channel connectors. Each pair of RF connectors is supported in a prescribed (fixed) spatial orientation that provides for blind-mating RF connectivity therebetween for either of two orientations and translation of the diplexer relative to the transceiver.

For this purpose, as in the radio architecture of FIG. 1 described above, the respective transmit and receive frequencies interfaced by the diplexer with an antenna are selected by one of two complementary frequency plans, the other of which is employed by a companion radio at a remote site. Also, the signal paths through the radio transceiver—diplexer arrangement may be configured as described in the '312 Patent. However, in place of cables, connections between the diplexer and the transceiver are effected by respective blind-mating RF connectors.

The diplexer's RF connectors are supported in a prescribed spatial orientation by a diplexer housing, that is adapted to be slidably insertable into the radio housing by way of a guide unit adjacent to the radio's transceiver. The guide unit may comprise a first set of guide elements (e.g., slots) configured to receive an associated set of guide elements (e.g. rails) of the diplexer support structure and thereby facilitate physical insertion and removal of the diplexer with respect the radio housing. To facilitate mutual connector alignment, the diplexer support housing may be keyed with respect to a diplexer reception cavity of the radio housing.

The transceiver is retained by a transceiver support structure containing a similar set of blind-mating RF connectors coupled to the transceiver's transmitter and receiver sections, respectively. The transceiver's RF connectors have the same spatial separation as, and interface genders complementary with those of the blind-mating RF connectors of the diplexer support structure. Insertion of the diplexer into the radio housing via the guide unit brings the diplexer's RF connectors into direct (blind-mating) physical and electrical engagement with the RF connectors of the transceiver. Once inserted, the diplexer may be securely retained in the radio housing by suitable fittings such as thumb screws.

DETAILED DESCRIPTION

Before describing in detail the new and improved cable-less blind-coupling, diplexer-to-transceiver interconnect arrangement of the present invention, it should be observed that the invention resides primarily in modular arrangements of conventional wireless (radio) transceiver components, digital communication circuits, power supply and connector hardware components. In terms of a practical implementation that facilitates their manufacture and installation at a communication site having access to an existing digital signal transporting wireline cable plant, these modular arrangements may be readily configured using field programmable gate array (FPGA) and application specific integrated circuit (ASIC) chip sets, and commercially available devices and components. As a consequence, the configurations of these arrangements and the manner in which they may be interfaced with an existing digital signal (T1) wireline link have been illustrated in readily understandable block diagram format, which shows only those specific details that are pertinent to the present invention, so as not to obscure the disclosure with details that are readily apparent to one skilled in the art having the benefit of present description.

Figure 1:
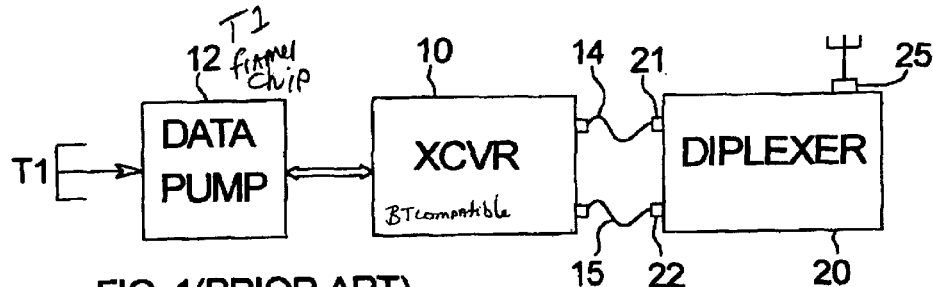
FIG. 1 diagrammatically illustrates the architecture of a wireline-powered T1 radio of the type described in the above-referenced '370 application.
Figure 2:
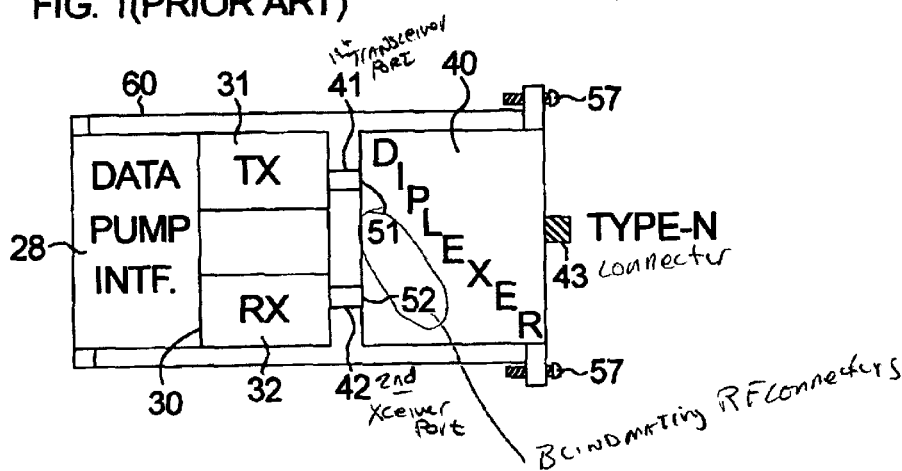
FIG. 2 is a diagrammatic plan view of an embodiment of the cable-less blind-coupling, diplexer-to-transceiver interconnect arrangement of the present invention.

Attention is now directed to FIG. 2, which is a diagrammatic plan view of a first, non-limiting embodiment of the cable-less blind-coupling, diplexer-to-transceiver interconnect arrangement of the present invention. As in the radio of FIG. 1, the radio contains a data pump 28 coupled with a transceiver 30, which includes a transmitter (Tx) section 31 that performs modulation and up-conversion of baseband signals (such as T1 data supplied from the data pump) to an FCC-conformal band RF signal (e.g., a 2–6 GHz spread spectrum signal), for application to the first transceiver port 41 of a diplexer 40. Similarly, in the receive direction, the transceiver 30 includes a receiver (Rx) section 32, wherein the received RF signal supplied from a second transceiver port 42 of the diplexer 40 is down-converted and demodulated to baseband for application to the data pump 28.

Like the radio architecture of FIG. 1, the respective transmit and receive frequencies interfaced by a (type-N) connector 43 of the diplexer 40 with an antenna are selected by one of two complementary frequency plans, the other of which is employed by a companion radio at a remote site. Also, the signal paths through the radio transceiver— diplexer arrangement are preferably as described in the '312 Patent. However, rather than using respective sections of relatively fragile and lossy cable to connect one of the two diplexer ports 41/42 to the transmit port of the transmitter section 31 of transceiver 30 and the other diplexer port 42/41 to the receive port of the receiver section 32 of transceiver 30, the two diplexer ports 41 and 42 are implemented by means of respective first and second blind-mating RF connectors 51 and 52.

Figure 3:
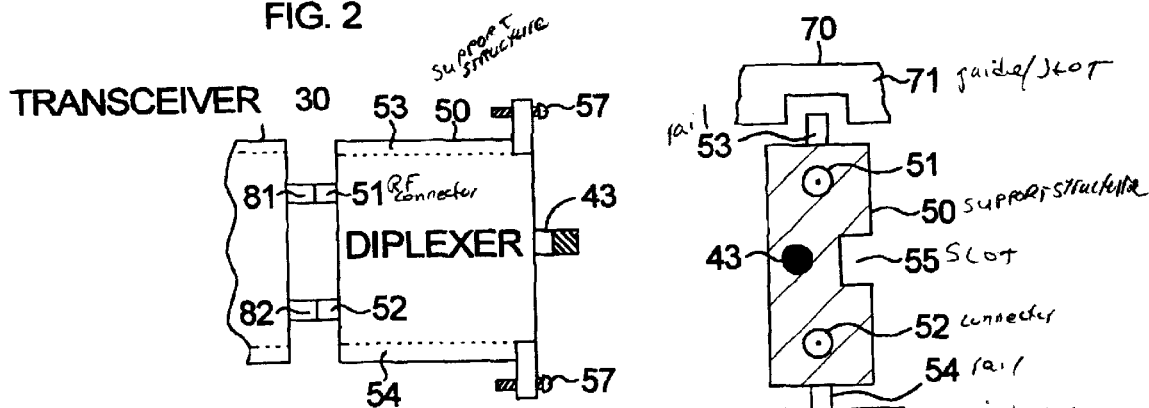
FIGS. 3 and 4 are respective diagrammatic plan and end views of a diplexer support structure.
Figure 4:
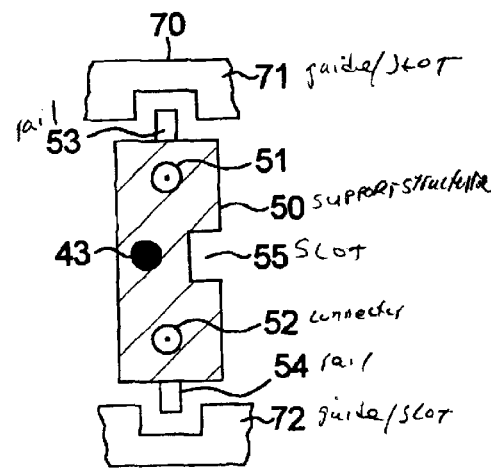

As shown in the plan view of FIG. 2 and the diagrammatic plan and end views of FIG. 3 and 4, the diplexer's RF connectors 51 and 52 are supported in a prescribed spatial orientation by a diplexer support structure 50, such as a support chassis or housing, that is adapted to be slidably insertable into the radio housing 60 via a guide unit 70 thereof, that is adjacent to the transceiver 30. As a non-limiting example, the guide unit 70 may comprise a set of guide elements 71/72, such as slots and the like, that are configured to engage an associated set of guide elements 53/54, such as rails, tracks and the like of the diplexer support structure 50, and thereby facilitate physical insertion and removal of the diplexer with respect the radio housing. To facilitate mutual connector alignment, the diplexer support housing 50 may be keyed with a guide slot 55 or the like, that is adapted to engage an associated guide rail, bar and the like (not shown), within a diplexer reception cavity of the radio housing.

Figure 5:
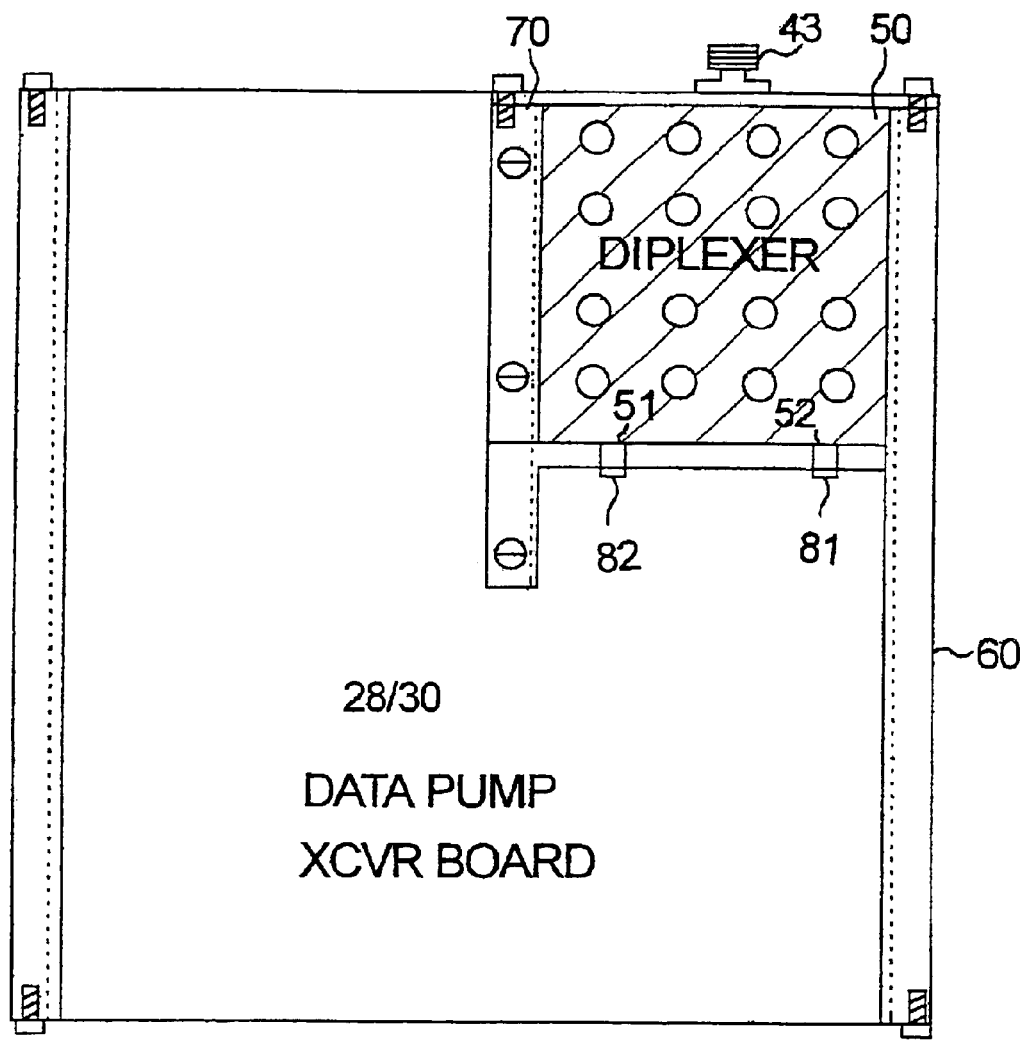
FIG. 5 is a diagrammatic plan view of a non-limiting alternative layout topography of the radio housing of the present invention.

The transceiver 30 is retained by a transceiver support structure that contains a similar set of first and blind-mating RE connectors 81 and 82, that are coupled to the transceiver's transmitter and receiver sections, respectively. The transceiver's RF connectors 81 and 82 have the same spatial separation as, and interface genders that are complementary to, those of the first and second blind-mating RF connectors 51 and 52 of the diplexer support structure 50. As a result, insertion of the diplexer 50 in either of two orientations into the radio housing via the guide unit 70 will bring the diplexer's RF connectors 51 and 52 into direct (blind-mating) physical and electrical engagement with the RF connectors 91 and 82 of the transceiver. In a first orientation, shown in FIG. 3, the first and second blind-mating RF connectors 51 and 52 of the diplexer support structure 50 are respectively brought into blind-fitting engagement with the RF connectors 81 and 82 of the transceiver 30. In a second orientation, diagrammatically illustrated in FIG. 5, the interconnections between the transceivers RF connectors 81 and 82 and the RF connectors 51 and 52 of the diplexer 50 are reversed or swapped so as to realize a second orientation, that implements an alternate frequency plan, as discussed above in connection with the US Patent to Nelson U.S. Pat. No. 6,178,312. Once inserted, the diplexer 50 may be securely retained in the radio housing by suitable fittings 57, such as thumb screws and the like, that are sized to engage associated complementary elements, such as threaded bores in the radio housing.

It should be noted that the layout of the circuit board components within the radio housing is not limited to any particular geometry, such as the generally 'stacked' or sequentially 'cascaded' topography of the plan view of FIG. 2. As a non-limiting example, and as shown in the plan view of FIG. 5, the radio's transceiver and data pump circuits may have a generally L-shaped layout within a generally rectangular housing, so as to accommodate the placement of the diplexer guide unit 70 at the 'bend of the L', and thereby provide a 'nested' component distribution within the radio housing.

As will be appreciated from the foregoing description, the problems associated with the use of lossy and relatively fragile sections of RF cable to connect a radio diplexer with an associated transceiver of a high band radio are effectively obviated by providing each of the radio transceiver and the diplexer with respective pairs of blind-mating RF transmission channel and receiver channel connectors, supported in a prescribed (fixed) spatial orientation that ensures blind-mating RF connectivity therebetween for either of two orientations and translation of the diplexer relative to the transceiver. With the elimination of the RF cable, that would require installation by a skilled technician during assembly of the radio, the customer is able to easily change the radio's frequency plan by simply removing, rotating and reinserting the diplexer.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A wireless communication architecture comprising:
   a transceiver that is adapted to transmit on a first of a plurality of communication channels and to receive on a second of said plurality of communication channels, and having a transmission channel connector and a receiver channel connector supported in a prescribed spatial orientation by a radio transceiver support structure; and
   a diplexer having an interface port adapted to interface wireless communication energy with a telecommunication channel, and first and second transceiver-coupling port connectors supported in said prescribed spatial orientation by a diplexer support structure, and wherein, for a first orientation and insertion of said diplexer support structure with respect to said transceiver support structure, one of said first and second transceiver-coupling port connectors is blind-engageable with said transmission channel port connector of said radio transceiver, and the other of which is blind-engageable with said receiver channel port connector of said radio transceiver, and wherein, for a second orientation and insertion of said diplexer structure with respect to said transceiver support structure, said one of said first and second transceiver-coupling port connectors is blind-engageable with said receiver channel port connector of said radio transceiver, and the other of said first and second transceiver-coupling port connectors is blind-engageable with said transmission channel port connector of said radio transceiver.

2. The wireless communication architecture according to claim 1, further comprising a diplexer guide structure configured to guide said diplexer, which has been placed in one of said first and second orientations, to an insertion location adjacent to said radio transceiver that brings said transmission channel and receiver channel connectors of said diplexer support structure into engagement with respective ones of said transceiver-coupling port connectors of said transceiver support structure.

3. A radio architecture comprising:
   a radio transceiver that is adapted to transmit on a first of a plurality of communication channels and to receive on a second of said plurality of communication channels, and having a transmission channel connector and a receiver channel connector supported in a prescribed spatial orientation by a radio transceiver support structure; and
   a diplexer having an antenna port adapted to be coupled to an antenna, and first and second transceiver-coupling, blind-mating connectors supported in said prescribed spatial orientation by a diplexer support structure, and wherein, for a first orientation of said diplexer support structure with respect to said transceiver support structure, one of said first and second transceiver-coupling, blind-mating connectors engages said transmission channel port connector of said radio transceiver, and the other of which engages said receiver channel port connector of said radio transceiver, and wherein, for a second orientation of said diplexer structure with respect to said transceiver support structure, said one of said first and second transceiver-coupling, blind-mating connectors engages said receiver channel port connector of said radio transceiver, and the other of said first and second transceiver-coupling, blind-mating connectors engages said transmission channel port connector of said radio transceiver.

4. The radio architecture according to claim 3, further comprising a diplexer guide structure configured to guide said diplexer, which has been placed in one of said first and second orientations, to a location adjacent to said radio transceiver that brings said transmission channel and receiver channel connectors of said diplexer support structure into engagement with respective ones of said transceiver-coupling port connectors of said transceiver support structure.

5. For use with a wireless communication device having a transceiver adapted to transmit on a first of a plurality of communication channels and to receive on a second of said plurality of communication channels, and having a transmission channel port and a receiver channel port, and a diplexer having an interface port adapted to interface wireless communication energy with a telecommunication channel, and first and second transceiver-coupling ports that are connectable with selected ones of said transmission and receive channel ports of said transceiver, a method of interfacing said first and second transceiver-coupling ports of said diplexer with said selected ones of said transmission and receive channel ports of said transceiver, said method comprising the steps of:
   (a) providing said transceiver with a transmission channel port connector and a receiver channel port connector that are supported in a prescribed spatial relationship by a transceiver support structure;
   (b) providing said first and second transceiver-coupling ports of said diplexer with associated first and second RF connectors that are supported in said prescribed spatial relationship by a diplexer support structure, so that for a first orientation and insertion of said diplexer support structure with respect to said transceiver support structure, one of said first and second transceiver-coupling port connectors is blind-engageable with said transmission channel port connector of said transceiver, and the other of which is blind-engageable with said receiver channel port connector of said transceiver, and wherein, for a second orientation and insertion of said diplexer structure with respect to said transceiver support structure, said one of said first and second transceiver-coupling port connectors is blind-engageable with said receiver channel port connector of said transceiver, and the other of said first and second transceiver-coupling port connectors is blind-engageable with said transmission channel port connector of said transceiver;

(c) placing said diplexer support structure in one of said first and second orientations; and (d) inserting said diplexer support structure into said transceiver support structure, and thereby causing said one of said first and second transceiver-coupling port connectors to blind-engage said transmission channel port connector of said transceiver, and the other of said first and second transceiver-coupling port connectors to blind-engage said receiver channel port connector of said transceiver.

6. The method according to claim 5, further comprising the steps of:

(e) changing the frequency plan of said transceiver by
removing said diplexer support structure from said transceiver support structure,
placing said diplexer support structure in the other of said first and second orientations, and
reinserting said diplexer support structure into said transceiver support structure, and thereby causing said other of said first and second transceiver-coupling port connectors to blind-engage said transmission channel port connector of said transceiver, and said one of said first and second transceiver-coupling port connectors to blind-engage said receiver channel port connector of said transceiver.

7. The method according to claim 5, wherein step (d) comprises providing said wireless communication device with a diplexer guide structure that is configured to guide said diplexer, when placed in either of said first and second orientations, to an insertion location adjacent to said transceiver that brings said transmission channel and receiver channel port connectors of said diplexer support structure into engagement with respective ones of said transceiver-coupling port connectors of said transceiver support structure.

* * * * *